April 14, 1931.  J. S. NORTON  1,800,656
WELDER'S HOOD
Filed May 20, 1930
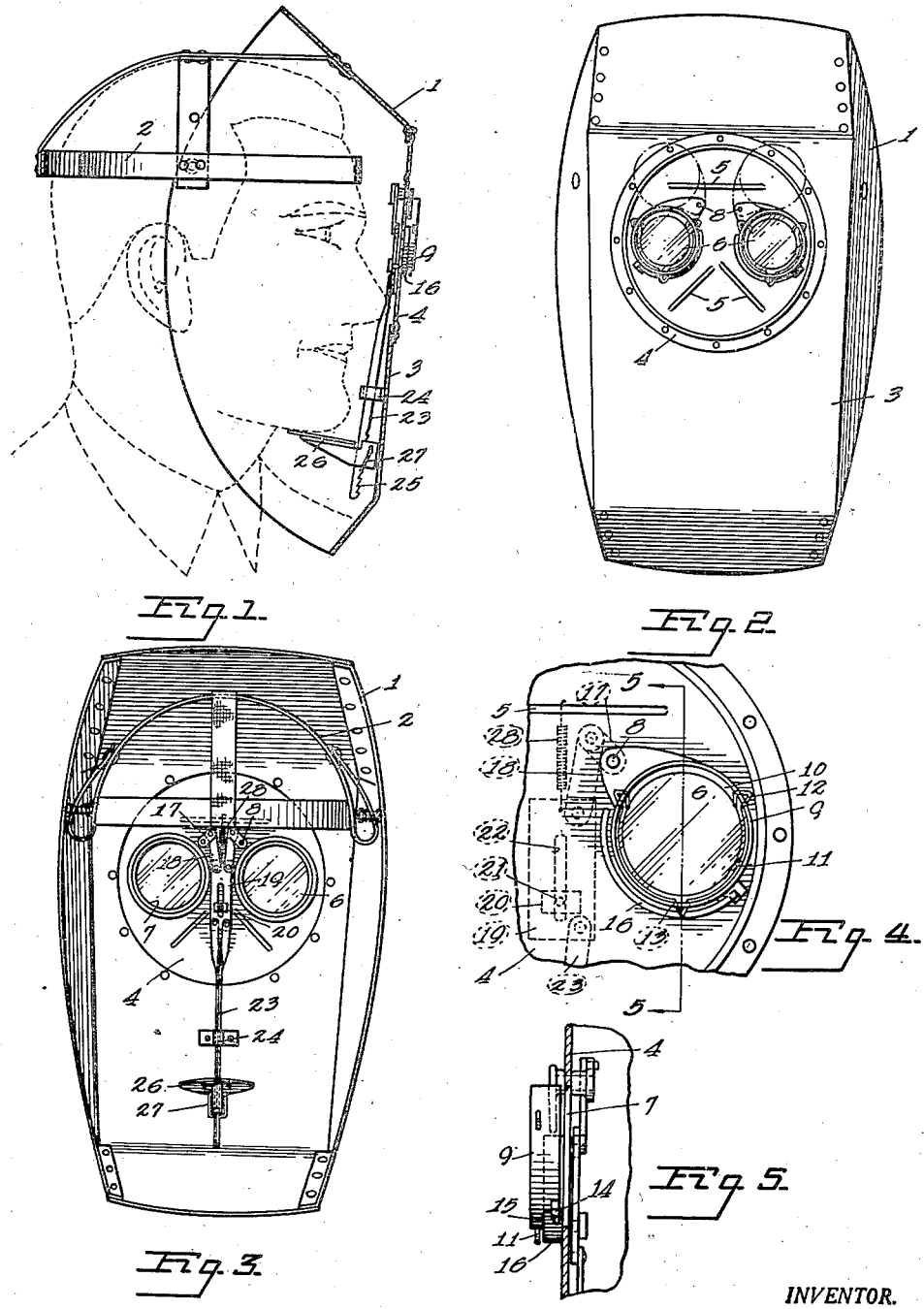
INVENTOR.
JOHN S. NORTON.
BY Munn & Co.
ATTORNEYS.

Patented Apr. 14, 1931

1,800,656

UNITED STATES PATENT OFFICE

JOHN S. NORTON, OF SAN FRANCISCO, CALIFORNIA, ASSIGNOR OF ONE-THIRD TO HARLIS CLYDE GREENE, OF VALLEJO, CALIFORNIA, AND ONE-THIRD TO W. F. HOLLINGSWORTH, OF SAN FRANCISCO, CALIFORNIA

WELDER'S HOOD

Application filed May 20, 1930. Serial No. 454,077.

My invention relates to improvements in welder's hoods, and it consists in the combinations, constructions and arrangements hereinafter described and claimed.

An object of my invention is to provide a welder's hood that has simple means for causing the eye glasses to move into open position when the operator desires to see how the work is progressing. The eye glasses swing in a plane parallel to the face of the glass, and the mechanism for moving the glasses is actuated by the chin of the operator.

A further object of my invention is to provide a device of the type described which is extremely simple in construction and which is durable and efficient for the purpose intended.

My invention is illustrated in the accompanying drawing, in which:

Figure 1 is a vertical section through the device,

Figure 2 is a front elevation,

Figure 3 is a rear elevation,

Figure 4 is a front elevation of a part of the device shown enlarged, and

Figure 5 is a section along the line 5—5 of Figure 4.

In carrying out my invention I make use of a welder's hood indicated at 1 that is adjustably carried by a head gear 2. These parts are standard in construction, and therefore need no further description.

In the face 3 of the hood I dispose a supporting member 4 preferably made of metal, this member being reinforced by ribs 5. Eye glasses indicated generally at 6 normally cover openings 7 (see Figure 5) in the member 4, and these eye glasses are swingable about pivots 8 into open position, thus permitting the operator to look through the openings 7.

Each eye glass is removably disposed in a rim 9 (see Figure 4), and this rim has a turned-in flange 10 which acts as a seat for the eye glass. Of course, the eye glass is of such a material as to protect the operator's eye while looking at an acetylene torch flame. A wire spring 11 of the shape shown in Figure 4 removably holds the glass 6 in the rim 9. The wire 11 has portions 12 that are passed through openings 13 in the rim for holding the glass in place.

It will also be seen from Figure 5 that the rim 9 has a cam-shaped projection 14 that is designed to enter a wedge-shaped notch 15 in a semi-circular flange 16 that is struck up from the member 4. The cam 14 co-acts with the notch 15 for wedging the rim 9 down upon the member 4 so as to provide a perfect shield for the eyes of the operator.

The means for swinging the eye glasses into the dotted-line position shown in Figure 2 comprises arms 17 that are connected to the pivot pins 8 which in turn are rotatably carried by the member 4. Figure 3 shows the arms 17 as having their free ends connected to links 18, and the links in turn are connected to a sliding member 19 that is guided and secured to the inner surface of the member 4 by a guide member 20 (see the dotted lines in Figure 4). The member 20 has a pin 21 secured thereto, and this pin passes through a guide slot 22 in the sliding member 19.

A chin rest carrying member 23 (see Figure 3) is secured to the member 19 and is guided by a bracket 24. Figure 1 shows how the lower end of the member 23 is serrated as at 25, and further shows how a chin-actuated member 26 is slidably mounted on the member 23. The member 26 is adjustably secured to the member 23 by a spring 27.

From the foregoing description of the various parts of the device, the operation thereof may be readily understood.

The device is applied to the operator's head in the usual manner, and the chin-actuated member 26 is adjusted so as to lightly bear against the chin of the operator (see Figure 1) when the eye glasses are in closed position. A spring 28 (see Figure 4) yieldingly holds the eye glasses in this position.

When the operator wishes to open the eye glasses, he merely lowers his chin, which causes the member 23 to move the parts 19, 18, 17, and to swing the eye glasses 6 about their pivots 8. The eye glasses will automatically swing into closed position when the operator raises his chin. It will be seen from this that a mere opening movement of the mouth will swing the eye glasses into open position, and that a closing movement of the mouth will permit the eye glasses to cover the openings 7.

In case an eye glass breaks, a new one can be readily substituted by the temporary removal of the wire 11 holding the glass. The wedge 14 is preferably disposed diametrically opposite the pivot point 8, and this construction results in a more perfect clamping of the eye glasses to the member 4 when the glasses are in closed position.

Although I have shown and described one embodiment of my invention, it is to be understood that the same is susceptible of various changes, and I reserve the right to employ such changes as may come within the scope of the claims hereto annexed.

I claim:

1. The combination with a welder's hood having openings for the eyes therein, glass covers for the openings pivotally carried by the hood and being movable in their planes, means for moving said covers into closed position, and cooperating means carried by said covers and said hood for wedging the covers to said hood when the covers are in closed position.

2. In a welder's hood, glass covers movable in their own planes, shafts for swinging the covers and being carried by the hood, arms secured to said shafts and being disposed on the inside of said hood, links secured to the arms, and a slidable member designed to be actuated by the chin of the operator, said member operating said links.

3. In a welder's hood having openings for the eyes therein, rims pivotally secured to the hood and being swingable over the openings, and glasses carried by said rims, wedge-shaped members carried by said rims, said hood having wedge-shaped notches for receiving the members.

4. In a welder's hood having openings for the eyes therein, rims pivotally secured to the hood and being swingable over the openings and glasses carried by said rims, wedge-shaped members carried by said rims, said hood having wedge-shaped notches for receiving the members, said members being disposed diametrically opposite the pivot points of the rims.

5. The combination with a welder's hood having two openings therein for the eyes, of eye glasses pivotally secured to the hood and swingable from a position covering the eye openings into a position uncovering the openings, a shaft for each eye glass and constituting its pivotal support, an arm for each shaft, a link connected to each arm, and a chin actuated slide connected to each link.

6. The combination with a welder's hood having openings for the eyes therein, of glasses pivoted to the outside of the hood and swingable in their own plane, and chin actuated means disposed on the inside of the hood and operatively connected to the glasses for swinging them into open position, and spring means for moving the glasses into closed position.

JOHN S. NORTON.